Jan. 7, 1941.   D. S. FERGUSON   2,228,228
THRESHING MACHINE
Filed Oct. 5, 1938
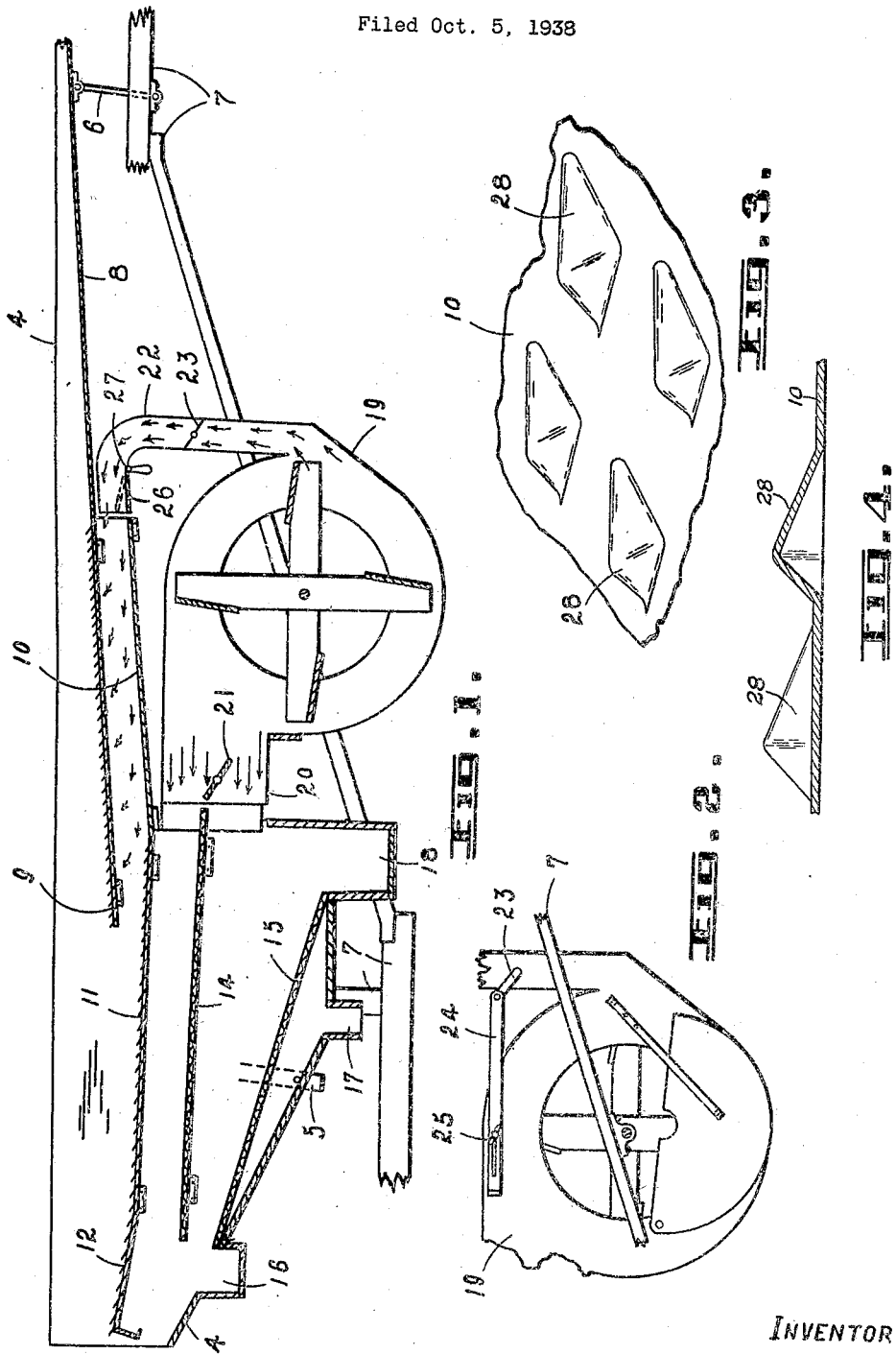
INVENTOR
Donald S. Ferguson
BY- David N. Gould
ATTORNEY Patented Jan. 7, 1941

2,228,228

UNITED STATES PATENT OFFICE 2,228,228

THRESHING MACHINE

Donald Sinclair Ferguson, Maxville, Ontario, Canada

Application October 5, 1938, Serial No. 233,485

4 Claims. (Cl. 209—318)

This invention relates to threshing machines and more particularly to the cleaning of the grain after the grain stocks have passed through the cylinder beater.

The principal object of my invention is to provide an auxiliary chaffer with air draft thereunder by which the capacity of the machine may be greatly increased in view of the fact that the auxiliary chaffer and auxiliary air blast increase the preliminary cleaning facilities and permit the thresher to be operated at a faster travel of material therethrough.

A further object of my invention is to provide a control and director for the air blast.

With the foregoing and other objects in view, as will appear as the description proceeds, the invention consists of the novel construction, combination and arrangement of co-operating elements as hereinafter more specifically set forth, claimed and shown in the accompanying drawing forming a part of the present application in which:

Fig. 1 is a longitudinal sectional view of my invention in combination with a thresher shoe, blower and part of the frame.

Fig. 2 is a detail view illustrating one end of the blower.

Fig. 3 is an enlarged perspective view of a fragmentary section of a modified form of grain pan.

Fig. 4 is a sectional view of a portion of the grain pan.

Like numerals of reference designate corresponding parts throughout the different views.

4 is the portion of the thresher commonly referred to as the shoe. The shoe 4 is supported on a pair of shoe-frame hangers 5 (only one shown) near the rear end thereof and a rocker arm 6 near the forward end thereof, the hangers and rocker arm being suitably supported from the general frame work of the thresher, parts of which are illustrated as at 7. When the thresher is in operation, the shoe 4 is reciprocally moved relative to the general frame thereof.

Supported transversely adjacent the front end of the shoe 4, I provide a primary grain pan 8. Extending from adjacent the rear end of the grain pan 8, I provide a primary grain chaffer 9. 10 is a secondary grain pan spaced downwardly from the chaffer 9 and extending substantially parallel through from the front end but preferably not fully to the rear end. 11 is the secondary grain chaffer, the front end of which extends from the rear end of the secondary grain pan 10. Preferably this secondary grain chaffer is at an angular disposition upward from the front end of the secondary grain pan 10 and is provided with a rear hinged portion 12, which may be adjusted according to certain grain cleaning conditions. 14 is the grain cleaning screen preferably positioned in spaced relationship under the secondary grain chaffer 11. The shoe 4 may be further provided with a weed or seed screen 15 and the desired spouts 16, 17 and 18 for tailings, seed and grain respectively.

19 is an air blower embodying a fan which, when in operation, will drive air outwardly through the discharge chute 20 under the grain cleaning screen 14 and the secondary grain chaffer 11. Transversely disposed in this chute 20 is the adjustable baffle plate 21 to direct a greater quantity of air towards the secondary grain chaffer 11 when such is desired. The blower 19 is provided with an auxiliary discharge chute 22, extending to a point in front of the space between the forward ends of the primary chaffer 9 and the secondary grain pan 10. The auxiliary discharge chute 22 is provided with an adjustable baffle plate 23, the transverse mounting rod of which may be moved or retained in position by means of the control member 24, supported from one face of the blower 19, by means of a thumb bolt 25 extending through the slot in the rear end thereof. The lower lip 26 at the discharge end of the chute 22 is hingedly connected by a transverse mounting rod 27, one end of which may protrude through the side wall of the shoe 4 and be so bent as to provide a handle by which the lip 26 may be adjusted and retained in adjusted position.

In the threshing of certain grain, it may be found advantageous to provide a secondary grain pan 10 with a plurality of air deflectors to agitate and direct the auxiliary air flow towards the preliminary grain chaffer 9. This may be accomplished in many different ways, one of which I have illustrated in Fig. 3. The secondary grain pan 10 is provided with upwardly formed or stamped portions 28, which portions are preferably staggered in relation to each other and are pointed or of such a shape at their front end so as not to retard the travel of the grain longtudinally over the grain pan. These upwardly formed or stamped portions 28 act as air buffers. Preferably each of the upwardly stamped portions is composed of four integral flat sides each of triangular formation and the sides to be first contacted by the grain are preferably of a greater elongated shape. The buffers cause a dividing of the grain as it travels over the grain pan and also the staggered relation of these buffers causes a breaking up of what otherwise would be a straight blast of air travelling between the chaffer 9 and the grain pan 10.

By embodying this construction into a threshing machine, I have found the same to be most advantageous in that a greater chaffer surface is provided in the same length of thresher and that the air blast from the auxiliary discharge chute 22 clears the grain of a considerable amount of the undesirable matter while passing over the preliminary chaffer and blows the same rearwardly to the wind stacker (not shown) without the same falling onto or contacting with the secondary grain chaffer 11.

The foregoing specification and annexed drawing disclose the preferred embodiment of my invention, but it is to be understood that minor changes may be resorted to in the commercial adaptation of my invention without departing from the scope of the invention as hereinafter claimed.

What I claim as new is:

1. A threshing machine embodying a reciprocally mounted shoe, a primary grain pad carried adjacent the reception end of said shoe; a primary grain chaffer extending from the rear end of said primary grain pan; a secondary grain pan supported on a plane under and spaced from said primary grain chaffer; a secondary grain chaffer extending from the rear end of said secondary grain pan and at an angle thereto; a blower; an auxiliary discharge chute from said blower; the discharge end of said chute being adjacent the forward ends of said primary grain chaffer and said secondary grain pan; and air deflectors provided on the upper face of said secondary grain pan.

2. A threshing machine embodying a reciprocally mounted shoe, a primary grain pan carried adjacent the reception end of said shoe, a primary grain chaffer extending from the rear end of said primary grain pan, a secondary grain pan supported on a plane under and spaced from said primary grain chaffer, a secondary grain chaffer extending from the rear end of said secondary grain pan and at an angle thereto, means for directing a blast of air over and substantially parallel to said secondary grain pan, means for varying air-blast delivery to the secondary grain pan to thereby vary the effect on the grain on said pan, a grain cleaning screen carried below and spaced from said secondary grain chaffer, means for directing a blast of air over and substantially parallel to said grain screen, the direction of said air blasts being the same as the movement of the grain, and means for disposing of the cleaned grain.

3. A threshing machine embodying a reciprocally mounted shoe, a primary grain pan carried adjacent the reception end of said shoe, a primary grain chaffer extending directly from the rear end of said primary grain pan, a secondary grain pan supported on a plane under and spaced from said primary grain chaffer, a secondary grain chaffer extending from the rear end and forming a continuation of said secondary grain pan, a blower, an auxiliary discharge chute from said blower, the discharge end of said chute being adjacent the forward ends of said primary grain chaffer and said secondary grain pan, and air deflectors provided on the upper face of said secondary grain pan.

4. A threshing machine according to claim 3 wherein the blower is provided with an auxiliary discharge chute therefrom, means for controlling the quantity of air passing through said chute and means for varying the force of the current of air as it is discharged from said chute.

DONALD SINCLAIR FERGUSON.

CERTIFICATE OF CORRECTION.

Patent No. 2,228,228. January 7, 1941.

DONALD SINCLAIR FERGUSON.

It is hereby certified that error appears in the printed specification of the above numbered patent requiring correction as follows: Page 2, first column, line 23, claim 1, for the word "pad" read --pan--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.